(12) United States Patent
Bai

(10) Patent No.: US 6,856,770 B2
(45) Date of Patent: Feb. 15, 2005

(54) METHOD AND SYSTEM FOR TRANSMITTING SIGNALS WITH SPECTRALLY ENRICHED OPTICAL PULSES

(75) Inventor: Yu Sheng Bai, Redwood City, CA (US)

(73) Assignee: Futurewei Technologies, Inc., Plano, TX (US)

( * ) Notice: Subject to any disclaimer, the term of this patent is extended or adjusted under 35 U.S.C. 154(b) by 684 days.

(21) Appl. No.: 09/802,222

(22) Filed: Mar. 8, 2001

(65) Prior Publication Data

US 2002/0036812 A1 Mar. 28, 2002

Related U.S. Application Data

(63) Continuation-in-part of application No. 09/642,033, filed on Aug. 18, 2000.

(51) Int. Cl.$^7$ ............................................. H04B 10/00
(52) U.S. Cl. ........................... 398/148; 398/81; 398/91; 398/147; 398/154; 398/160; 398/183; 398/186; 398/188; 398/199; 398/189
(58) Field of Search ........................... 398/81, 91, 141, 398/147, 148, 113–114, 159–160, 183, 186, 188–200

(56) References Cited

U.S. PATENT DOCUMENTS

| | | | | | |
|---|---|---|---|---|---|
| 5,473,458 | A | * | 12/1995 | Mamyshev et al. | 398/160 |
| 5,515,196 | A | * | 5/1996 | Kitajima et al. | 398/185 |
| 6,011,638 | A | * | 1/2000 | Mamyshev et al. | 398/147 |
| 6,021,235 | A | * | 2/2000 | Yamamoto et al. | 385/24 |
| 6,122,088 | A | * | 9/2000 | Hasegawa | 398/199 |
| 2002/0191262 | A1 | * | 12/2002 | Yamada et al. | 359/183 |

\* cited by examiner

*Primary Examiner*—Kinfe-Michael Negash
(74) *Attorney, Agent, or Firm*—Gary L. Bush; Andrews Kurth LLP (57) ABSTRACT

A system and method for transmitting data modulated spectrally enriched optical pulses with a frequency chirp via an error free propagation region of an optical fiber, in which spectrum of optical pulses gradually depletes from the spectrum that is substantially wider than the spectrum of Fourier-transform limit at an input of the error-free propagation region and becomes comparable to the Fourier-transform limit at an output of this region. The gradual depletion of the spectrum is achieved by utilizing a frequency chirp converter having a dispersion sign opposite to a dispersion sign of the optical fiber.

33 Claims, 7 Drawing Sheets

METHOD AND SYSTEM FOR TRANSMITTING SIGNALS WITH SPECTRALLY ENRICHED OPTICAL PULSES

This application is a continuation-in-part of the U.S. application Ser. No. 09/642,033 filed Aug. 18, 2000, now pending.

FIELD OF THE INVENTION

The present invention relates to optical transmission method and system for optical fiber communication network, and more particularly, to Wavelength Division Multiplexing (WDM) optical fiber transmission method and system for transmitting short pulse signals with a frequency chirp.

BACKGROUND OF THE INVENTION

In the history of commercial deployment of fiber networks, the dominating tendency was to minimize the spectral width of transmitted signals. There have been at least two motivations to pursue spectral minimization: to reduce signal dispersion within transmission line and to simplify the equipment for signal transmission in Non-Return-to-Zero (NRZ) format.

A majority of contemporary WDM transmission systems operate at a data rate of 2.5 Gb/s (OC-48) and utilize standard single-mode fiber (SMF) with chromatic dispersion D about 17 ps/nm*km. In these systems, the transmission distance is limited to about 600 km and does not require dispersion compensation. For WDM systems of higher bit rates (10 and 40 Gbit/s) and similar reach, dispersion compensation is required. Deployment of dispersion compensating means such as dispersion compensating fibers or fiber gratings eliminates unwelcome linear dispersion impairment [A. H. Gnauck and R. M. Jopson, "Dispersion Compensation for Optical Fiber Systems", Chapter 7 in *Optical Fiber Communication Systems*, Vol. IIIA, Ed. I. P. Kaminow and T. L. Koch, Academic Press, San Diego, 1997].

The performance of dispersion compensated systems with periodic optical amplification is limited by accumulation of spontaneous emission noise and fiber non-linearity. To optimize the NRZ-format system performance, a fine balance has to be achieved between maximizing optical signal-to-noise ratio and minimizing nonlinear effects such as self-phase modulation (SPM), cross-phase modulation (XPM), and four-wave-mixing (FWM). Conventional power per individual channel at the input of each fiber span is about 1 mW (0 dBm), resulting in a maximum propagation distance of several hundred kilometers. For single channel transmission and for WDM multi-channel transmission in non-dispersion-shifted fibers, SPM is the dominating nonlinear effect. An optical signal propagating in the fiber experiences an intensity dependent phase shift $\phi_{NL}(t,z)$ given by [G. P. Agrawal, *Nonlinear Fiber Optics*, Chapter 4, Academic Press, San Diego, 1989]:

$$\phi_{NL}(t,z)=\gamma P(t)z, \quad (1)$$

where $\gamma$ is the nonlinear coefficient of the fiber, P is the optical power, and z is the effective propagation length. Because the signal intensity is time-dependent, new spectral (frequency) components are produced:

$$\Delta\omega=-d\phi_{NL}/dt. \quad (2)$$

When coupled with dispersion, these new spectral components interfere with the original components and distort the temporal shape of the signal. The NRZ data stream is a complicated temporal pattern, in which each individual bit is distorted differently than other bits and therefore cannot be globally restored. As a result, NRZ-format transmission systems are designed to work in the linear regime with a small nonlinear phase shift, $\phi_{NL}(t,z)<<1$. In general, utilization of NRZ format and minimization of the spectral content limits further development of transmission technology.

Several approaches were developed to overcome the non-linear distortion problem, all of them based on transmitting short optical pulses, or using return-to-zero (RZ) format. The important advantage of RZ format is that the distortion caused by SPM is pattern-independent. In RZ format, every single bit representing 1 is a single pulse identical to other pulses. If a single pulse is compensated for the SPM distortion, then the whole data stream is compensated automatically.

In retrospect, the first method of nonlinear distortion compensation was the propagation of optical solitons [L. F. Mollenauer, J. P. Gordon, and P. V. Mamyshev, "Solitons in High Bit-Rate, Long-Distance Transmission", Chapter 12 in *Optical Fiber Communication Systems*, Vol. IIIA, Ed. I. P. Kaminow and T. L. Koch, Academic Press, San Diego, 1997]. To create an optical soliton, a Fourier-transform limited optical pulse having maximum power of several dBm is propagated in optical fiber with small positive dispersion. The general idea of soliton propagation is that the pulse shape is affected by chromatic dispersion and non-linearity in a way that these two factors counterbalance each other. For a certain range of pulse duration and optical power the pulse shape is kept constant along the fiber. The trend of the pulse to expand due to linear dispersion is compensated by contraction due to self-phase modulation so that the pulse is kept intact during the propagation. In other words, the combined effect of linear dispersion and SPM on the propagating pulses is continuously compensated at every point in the fiber. Using soliton transmission technology, Fourier transform limited light pulses of about 10–30 ps duration and peak power of several dBm may be propagated along fiber spans of many thousands of kilometers without significant shape degradation.

The balance between linear and nonlinear contributions, however, could be maintained only within certain ranges of pulse power and dispersion (D<~1 ps/nm*km). The low dispersion requirement limits the applicability of soliton transmission to special types of fiber such as dispersion-shifted fibers (DSF), where the zero wavelengths dispersion is 1.5 micron. The power range requirement means that in-line optical amplifiers must be spaced much closer than the customary span length for commercial terrestrial long-haul networks. Further complication is caused by soliton timing jitter (known as the Gordon-Haus effect) induced by the soliton coupling with the accumulated amplifier noise. Special filtering schemes were developed to reduce the timing jitter and allow for extra long propagation of signals. However, these schemes are generally too complicated to deploy in commercial transmission systems. As a result, the soliton transmission though studied for almost 20 years has not found commercial applications.

In the last few years, a new approach for RZ transmission has been developed called dispersion-managed solitons, or quasi-solitons (M. Suzuki et al, Electronics Lett., Vol. 31, p. 2027, 1995; J. H. B. Nijhof et al, Opt. Lett., Vol 23, p. 1674, 1998; F. Favre et al, Jour. Lightwave Tech., Vol 17, p. 1032, 1999). According to this approach, the nonlinear dispersion is compensated within each span of fibers in a periodically optically amplified fiber transmission line, instead of being continuously compensated at each point of the fiber as in standard soliton transmission. It is based on a basic phenomenon of propagating of linearly frequency chirped pulses in nonlinear media: when the linear chirp and non-linearity-induced chirp of the pulse are in the same direction the spectral bandwidth of the pulse increases; when they are in the opposite directions the spectral bandwidth decreases. If the linear dispersion of the media periodically changes sign in a properly designed way, the spectral content of the propagating pulse and its shape would also vary periodically. By using appropriate pre-dispersion and arrangement of fibers of positive and negative dispersions, commonly referred to as "dispersion map", one could periodically reconstruct the original pulses, both in terms of duration and spectral bandwidth, at each optical amplifier site along the transmission line. However, to achieve this indefinite oscillatory mode, the dispersion management has to be very precise (have extremely small tolerances) which is difficult to implement in practice.

Therefore, the telecommunication industry is in need of new methods and systems for transmitting signals via multiple spans of optical fiber without considerable linear or non-linear distortions.

SUMMARY OF THE INVENTION

In accordance with the present invention a system is provided for transmitting signals over an optical fiber using spectrally enriched optical pulses with a frequency chirp. The system is comprised of an optical transmitter with an optical source for generating spectrally enriched optical pulses having a spectrum that is substantially wider than the spectrum of a Fourier-transform limited pulse of the same duration, and a frequency chirp converter for providing an externally induced frequency chirp and converting the frequency chirp of the spectrally enriched optical pulses. The frequency chirp converter is a dispersion compensating means having a dispersion sign opposite to a dispersion sign of the optical fiber and placed within the input of the optical fiber. The spectrum of the optical pulses depletes gradually while propagating along the optical fiber. An optical receiver is placed within the optical fiber link at or beyond an error free propagation distance from the optical transmitter. The error free propagation distance is a segment of the optical fiber along which the temporal shape of the optical pulse does not change significantly. At an input of the optical receiver, the optical pulses are restored to a temporal duration and shape comparable to that at the optical transmitter, with their spectral content substantially depleted compared to initial spectrum at the optical transmitter.

Several types of laser sources may be used in the optical transmitter for producing the required optical pulses. According to the present invention any type of the laser source that is used should be coupled to the frequency chirp converter.

Multichannel WDM communication systems constitute a significant number of optical fiber transmission systems. According to the present invention, a multichannel WDM communication system propagates spectrally enriched optical pulses via an optical fiber, and comprises a plurality of WDM optical transmitters for generating spectrally enriched, data modulated optical pulses within the corresponding plurality of individual optical channels. In every individual channel, the optical pulses are frequency-chirped and have an optical spectrum that is substantially wider than the spectrum of Fourier-transform limited pulses of the same duration. A WDM multiplexer combines the outputs of the WDM optical transmitters into a multiplexed optical signal.

According to one embodiment each WDM optical transmitter comprises a frequency chirp converter, and according to the other embodiment, the plurality of WDM transmitters is coupled to a frequency chirp converter that is placed at the output of the WDM multiplexer.

A method of transmitting signals using spectrally enriched optical pulses via an optical fiber may utilize optical transmitters with different types of optical sources for generating optical pulses having enriched optical spectra that are substantially wider than a spectrum of Fourier-transform limited pulses of the same duration. The spectrally enriched optical pulses with a frequency chirp are modulated by digital data and transmitted via the optical fiber. While propagating via an error free propagation region of the optical fiber the temporal shape of each pulse is unchanged, however the spectrum is depleted from its initial wide bandwidth down to near the Fourier-transform limit. In order to extend the error free propagation region, an externally induced frequency chirp with a dispersion sign opposite to dispersion sign of the optical fiber is provided by a frequency chirp converter for slowing down a depletion of the spectrum of the optical pulses. The error free propagation region comprises a plurality of fiber spans. Optical amplifiers and dispersion compensating devices restore the intensity and temporal shapes of the optical pulses distorted by dispersion induced by the optical fiber.

BRIEF DESCRIPTION OF DRAWINGS

The accompanying drawings, which are incorporated in and form a part of this specification, illustrate embodiments of the invention and, together with the description, serve to explain the principles of the invention. In the drawings.

DETAILED DESCRIPTION OF THE INVENTION

Figure 1:
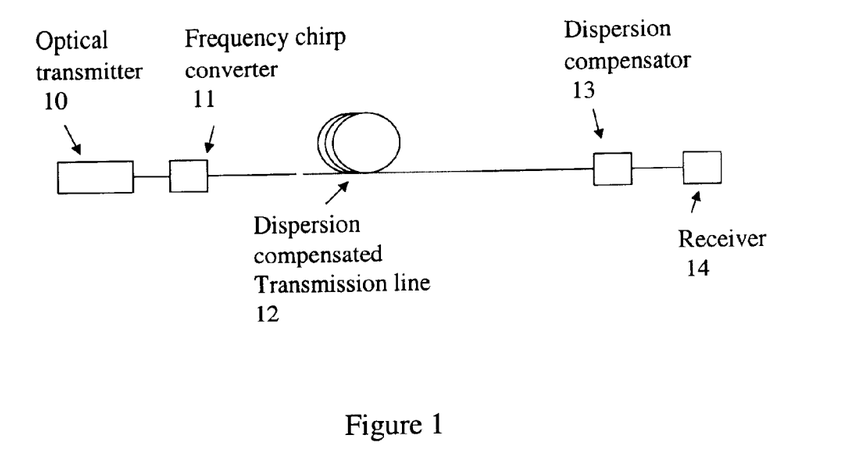
FIG. 1 shows a schematic diagram of a system for transmitting phase and data modulated spectrally enriched optical pulses via dispersion compensated transmission line.
Figure 2:
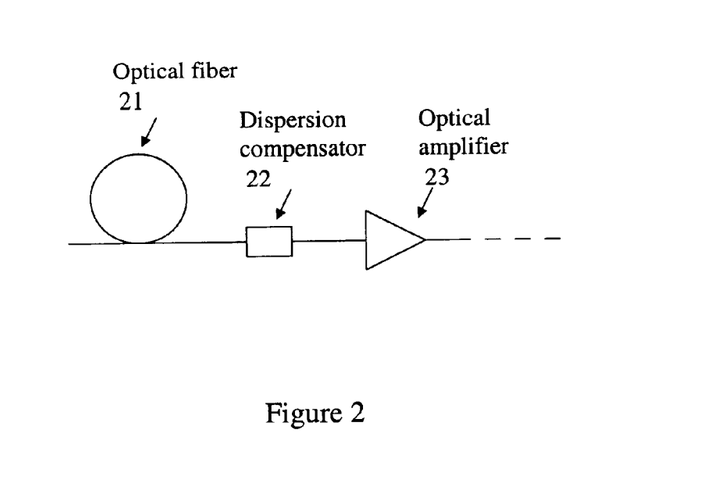
FIG. 2 shows a schematic diagram of a span of a dispersion compensated optical fiber equipped with one optical amplifier and one dispersion compensator for transmitting the spectrally enriched data modulated optical pulses with a frequency chirp.

The present invention involves a transmission of phase and data modulated optical pulses having a spectrum enriched compared to the spectrum of Fourier-transform limited optical pulses of the same duration via an optical fiber as shown in FIG. 1. The phase and data modulated optical pulses of enriched spectrum generated by an optical transmitter 11 are propagating via dispersion compensated transmission line 12. In transmission line 12, the optical pulses are affected by linear dispersion and nonlinear SPM resulting in pulse distortion. Each span of SM optical fiber 21 (FIG. 2) is supplied with a dispersion compensator 22 followed by an optical amplifier 23 for linear dispersion compensation and maintenance of intensity of the optical pulses. Phase distortion of the optical pulse induced by SPM follows the pulse intensity profile. This phase distortion produces a frequency chirp accumulating along transmission line 12. If the optical transmitter 11 generates Fourier-transform limited pulses having no chirp, accumulation of SPM-related distortion can not be compensated unless quasi-soliton transmission is arranged. Accumulation or depletion of the pulse spectrum inevitably leads to the pulse shape distortion.

In the present invention, the optical pulses launched into the optical fiber have an enriched spectrum and subsequent frequency chirp which is opposite to the SPM-induced chirp. SPM-induced frequency chirp is monotonically accumulated along the fiber span and subtracted from initial pulse chirp introduced by the transmitter. Respectively, the spectral content of the pulse is depleted, and the spectrum narrows down toward the spectral width of the Fourier-transform limit for a pulse of the same duration. While the pulse spectrum remains enriched, the temporal shape of the pulse changes only slightly, and the transmission remains error-free. With the spectral width comparable to the Fourier-transform limit, the pulse distortion becomes significant. At this point, the pulse reaches its maximum error-free propagation length, and should be received.

The maximum error-free propagation distance can be further extended due to a frequency chirp converter that provides an externally induced frequency chirp causing the reduction in rate of spectrum depletion. The frequency chirp converter is a dispersion compensating means such as a segment of the dispersion compensating fiber or fiber gratings. The frequency chirp converter provides a dispersion sign opposite to a dispersion sign of the transmission fiber. The use of the frequency chirp converter leads the pulses to compress to the minimum duration at required location in the transmission fiber. The combined effect of SPM and dispersion is such that when propagating in transmission fibers with positive dispersion (D>0), the spectrum of the pulse widens before being compressed to the minimum duration and narrows afterwards. When propagating in transmission fibers with D<0, the spectrum of the pulse narrows before being compressed to the minimum duration and widens afterwards. Therefore, with properly selected location for the pulse compression, the spectrum widening and the spectrum narrowing can approximately cancel with each other and result in an overall spectral depletion at a slower rate.

This qualitative description is fully supported by analytical and numerical computations. In the retarded time frame moving together with the pulse, its propagation is described by a Nonlinear Shrodinger Equation (NSE):

$$-i\frac{\partial u}{\partial z} = \frac{\partial^2 u}{\partial t^2} + \varepsilon |u|^2 u \tag{3}$$

where u is field amplitude, z and t are coordinate and time in the retarded frame, and $\epsilon = <<1$. In the no-dispersion case $$\left(\frac{\partial^2 u}{\partial t^2} = 0\right),$$

the evolution of SPM-induced chirp is [L. F. Mollenauer, J. P. Gordon, and P. V. Mamyshev, "Solitons in High Bit-Rate, Long-Distance Transmission", Chapter 12 in *Optical Fiber Communication Systems*, Vol. IIIA, Ed. I. P. Kaminow and T. L. Koch, Academic Press, San Diego, 1997]:

$$u(z,t) = u(0,t) \exp(i|u(0,t)|^2 z)$$

or for z<<1

$$u(z,t) \approx u(0,t)(1+i|u(0,t)|^2 z) \tag{4}$$

where u(0,t) is the fundamental field at the fiber input. With non-zero dispersion, the solution may be presented as $$u(z,t) \approx u_0(z,t)(1+\epsilon u_1(z,t)) \tag{5}$$

Insertion of (5) into (3) yields a system of two equations:

$$-i\frac{\partial u_0}{\partial z} = \frac{\partial^2 u_0}{\partial t^2} \tag{6}$$

$$-i\frac{\partial u_1}{\partial z} = \frac{2}{u_0}\frac{\partial u_0}{\partial t}\frac{\partial u_1}{\partial t} + |u_0|^2 \tag{7}$$

Equation (7) is equivalent to a system of two first order ordinary differential equations:

$$\frac{du}{dz} = i|u_0(z, t(z))|^2 \tag{8}$$

$$\frac{dt}{dz} = 2i\frac{\partial (\ln u_0)}{\partial t} \tag{9}$$

where Eq.(9) is a characteristic equation for the partial differential Equation (7). Eq. (8) shows that the SPM effect accumulates along the fiber, and both components $u_0$ and $u_1$ are functions of z. With non-zero dispersion, no exact SPM compensation may be achieved because the initial chirp of the optical pulse is defined at the fiber input. However, the SPM compensation is relevant where the pulse power is high, which is at the input of fiber span. Creating the initial frequency chirp of the same shape and of opposite sign to (8) at the input of the fiber span reduces the impact of SPM significantly.

Figure 3:
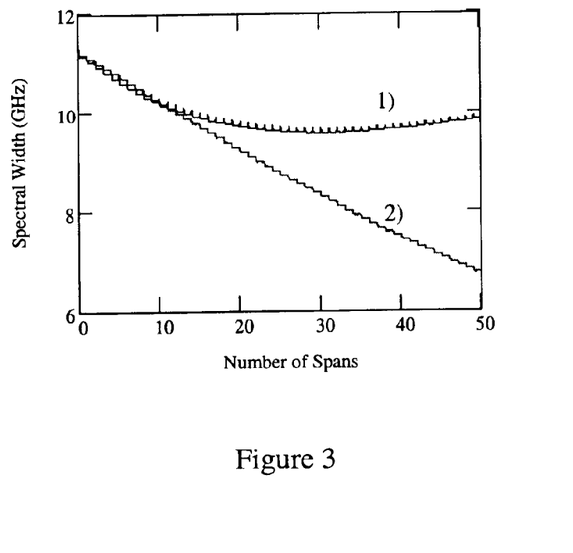
FIG. 3 shows a numerical simulation of spectral depletion of the optical pulses with a frequency chirp converter (curve 1) and without the frequency chirp converter (curve 2) along an error free propagation region comprising a plurality of spans of the optical fiber.

FIG. 3 shows the calculated pulse spectral width for PRBS data pulses with frequency chirp as a function of the number of spans proportional to the length of a realistic transmission line, with a span length of 80 km. The transmission fiber is assumed to be standard single mode fiber (SSMF) with dispersion of 17 ps/nm·km. According to the data presented in FIG. 3, the maximum error free transmission length without externally induced frequency chirp is within several thousand kilometers. With a frequency chirp converter, the spectrum depletion is much slower that results in a substantially longer transmission distance.

To balance between the spectral widening and the spectral narrowing, the location of the pulse compression is chosen to be approximately half of the nonlinear length after the optical amplifier in each span, which is defined to be [F. Forghieri, R. W. Tkach, and A. R. Chraplyvy, "Fiber Nonlinearities and Their Impact on Transmission Systems", Chapter 8 in *Optical Fiber Communication Systems*, Vol. IIIA, Ed. I. P. Kaminow and T. L. Koch, Academic Press, San Diego, 1997], $$L_{\mathit{eff}} = [1 - \exp(-\alpha L_{span})]/\alpha \tag{10}$$

where $\alpha$ is the absorption coefficient of the transmission fiber and $L_{span}$ is the length of the fiber in each span. For most transmission fiber links, $L_{\mathit{eff}}$ is approximately 20 km. In FIG. 3, the frequency chirp converter has a cumulative dispersion (with opposite sign) equivalent to that of 10 km transmission fiber.

The concept of propagation of pre-chirped spectrally enriched optical pulses with gradual spectral depletion along the transmission line is a method of optical signal transmission according to the present invention. This concept may be implemented in several embodiments. Each of these embodiments utilizes the dispersion compensated transmission line comprising a plurality of spans of the optical fiber. Commercially suitable spans have a length in a range between about 50 km to 120 km with respective dispersion in a range of $$(2-17)\frac{p\ \sec}{\text{nm} \cdot \text{km}}.$$

Figure 4:
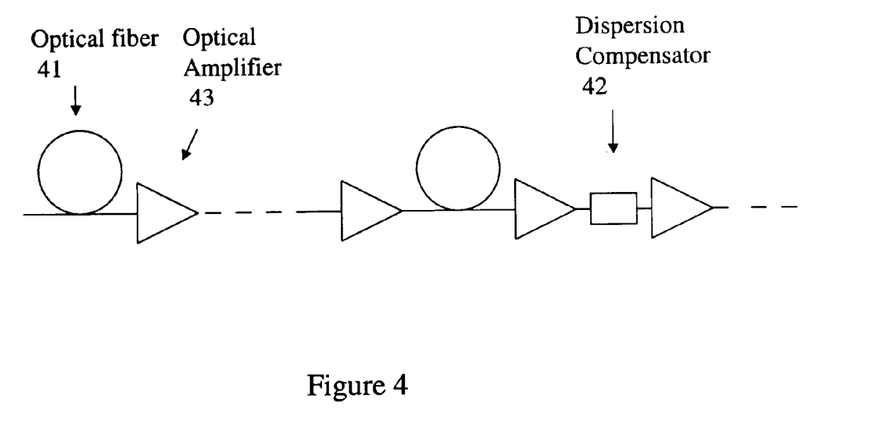
FIG. 4 shows a schematic diagram of a section of the dispersion compensated optical fiber, where several spans of transmission fiber are compensated by one frequency chirp converter, for transmitting the pre-chirped spectrally enriched data modulated optical pulses.
Figure 5:
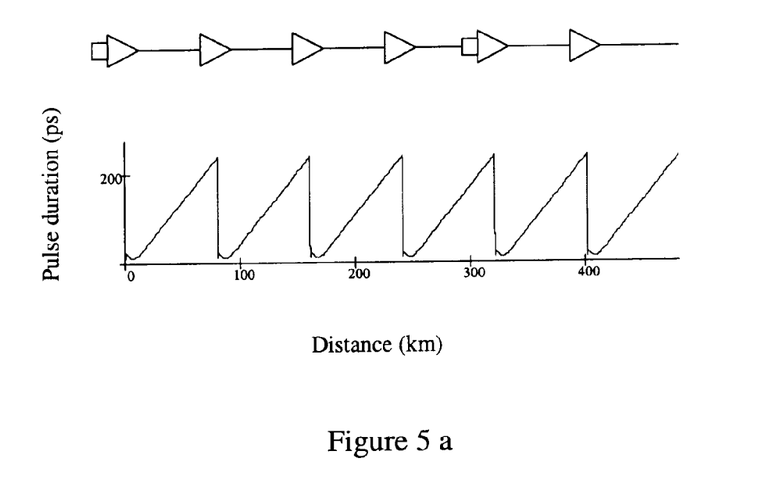
FIGS. 5a and 5b show evolution of optical data pulse duration over transmission distance for the two dispersion compensation configurations shown respectively in FIG. 2 and FIG. 4.

To obtain the dispersion compensation and power restoration, each span 21 is supplied with a dispersion compensator 22 and at least one optical amplifier 23. The dispersion compensator 22 introduces dispersion opposite to the dispersion of the optical fiber, and serves to compensate the fiber dispersion. The dispersion compensator 22 may be made of a segment of dispersion compensating fiber or a Bragg grating. The optical amplifier 23 restores the intensity of an optical signal propagating via SM span 21 to its initial value. When the dispersion of the transmission fiber is in the range of 2–6 ps/nm·km, as in the case of non-zero dispersion shifted fibers (NZDSF), each dispersion compensator can be used for several amplifier spans instead of each amplifier span as shown in FIG. 4. This configuration may reduce the cost and improve the performance of the transmission system, because of reduction of the number of components used in the link. The determination of the location for the pulse compression is exemplified in FIG. 5*b*, where one dispersion compensator is used for every four amplifier spans. The transmission fiber has a dispersion of 4 ps/nm·km. The length of each span is 80 km. The location for pulse compression is chosen to be approximately halfway between the end of nonlinear length of the second span and the beginning of the third span. The cumulative dispersion introduced by the frequency chirp converter is equivalent to the cumulative dispersion introduced by 130 km transmission fiber. The evolution of the pulse duration for the SSMF with one dispersion compensator in every span is shown in FIG. 5*a*.

Generally, when one dispersion compensator is used for 2n spans, where n being an integer, the location for pulse compression is provided at approximately halfway between the end of nonlinear length of the n span and the beginning of the (n+1) span. When one dispersion compensator is used for (2n+1) spans, the location for pulse compression should be either at approximately halfway between the end of nonlinear length of the (n) span and the beginning of the (n+1)th span, or at approximately half of the non-linear length of the (n+1) span.

Preferably, the optical pulses generated by the optical transmitter having duration of about 20% to 50% of the bit period. The bandwidth of the spectrally enriched optical pulses at the input of dispersion compensated transmission line exceeds the Fourier-transform limit of this duration respectively by 50% to 200%. Pulse frequency chirp introduced to the spectrally enriched optical signals is similar to the chirp frequency introduced by SPM but has the opposite sign. As a result, the nonlinear distortion induced by SPM in a periodically amplified and dispersion compensated transmission line leads to an incremental depletion of the frequency chirp of the spectrally enriched pulses. If the temporal dependence of the frequency chirp is chosen properly, then the propagation of the spectrally enriched optical pulse causes a gradual depletion of its frequency chirp while the pulse temporal shape does not change significantly.

The optical transmitter utilizes an optical source for generating optical pulses. Different types of optical sources may be used depending on the commercial application.

Figure 6:
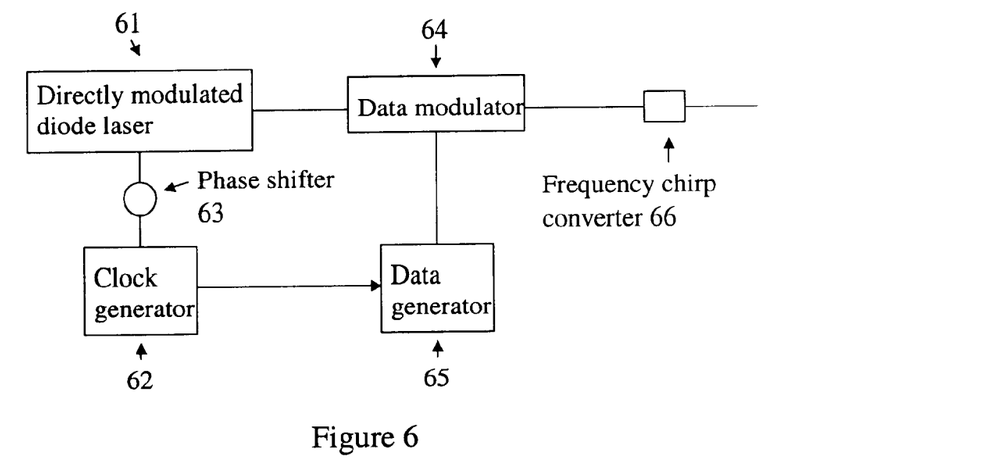
FIG. 6 shows a schematic diagram of an optical transmitter having a directly modulated diode laser with an external data modulator that is connected to a frequency chirp converter.

In FIG. 6, a directly modulated laser diode 61 is used as an optical source of frequency chirped optical pulses. Conventionally, system designers avoid direct modulation or gain switching of laser diodes because laser pulses exhibit dynamic shift of the lasing frequency (frequency chirp), which traditionally is considered damaging for the transmission. The frequency chirp being proportional to the time derivative of the modulated phase is related to the time dependence of the carrier concentration due to the effect of free carriers on the refractive index of the semiconductor materials. (G. P. Agrava; and N. K. Dutta, "Semiconductor Lasers", New York, 1993). When the free carrier concentration is higher fat the beginning of the pulse) the emitted frequency is higher, and when the concentration of free carriers is depleted (pulse tail), the emitted frequency is lower than that emitted by the laser operating in CW mode.

In the embodiments of the present invention, the direct modulation of laser diodes was discovered to be a useful application of a physical phenomenon customarily considered damaging to the signal transmission. A clock generator 62 is employed to drive the diode laser. The frequency chirp of the optical pulses emitted by the laser 61 depends significantly on the driving voltage of the clock generator 62. A phase shifter 63 provides time delay adjustment between the clock generator 62 and a data generator 65. A data modulator 64 driven by the data generator 65 externally modulates the sequence of optical pulses emitted by the laser 61. The data modulator 64 is connected to a frequency chirp converter 66.

Figure 7:
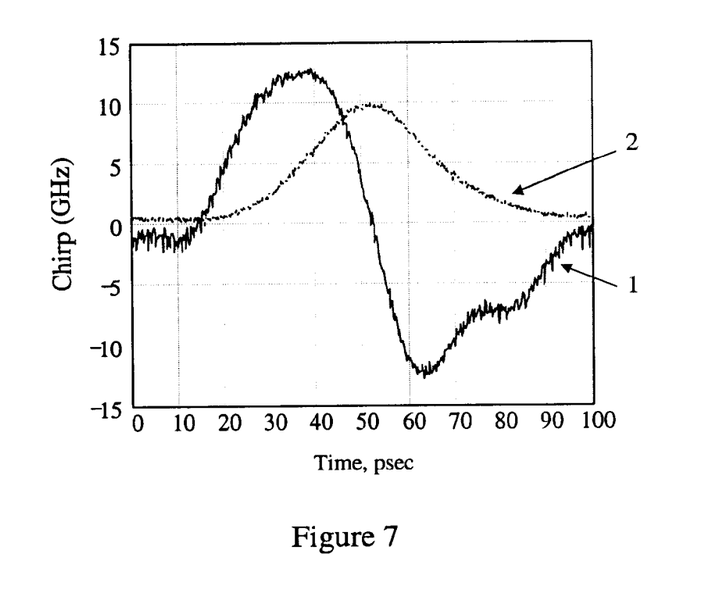
FIG. 7 illustrates a frequency chirp of the optical pulses emitted by the directly modulated laser (curve 1), and intensity of the pulse (curve 2).

In FIG. 7, a typical shape of the optical pulse (curve 1) is shown for a directly modulated diode laser, together with intensity of the pulse (curve 2). The frequency chirp of a few tens of GHz is generally obtained in contemporary practice which makes this embodiment particularly suited for OC-192 (10 Gb/s) data transmission. When the laser diode is modulated at a frequency comparable to its relaxation frequency (typically about 5–10 GHz), the frequency chirp has a shape opposite to the frequency chirp induced by SPM.

Figure 8:
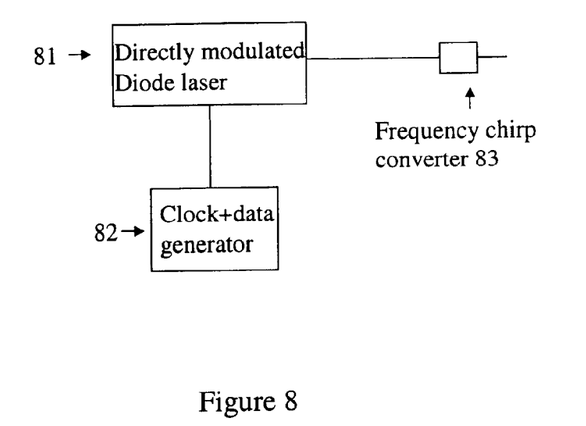
FIG. 8 shows a schematic diagram of an optical transmitter having a directly modulated diode laser with internal data modulation and a frequency chirp converter.

FIG. 8 shows a directly modulated diode laser 81 driven by an electronic unit 82 combining functions of clock and data modulation. This is yet another example of the directly modulated laser diode which output pulses exhibit dynamic frequency shift (chirp) due to the changes of the free carrier concentration. The laser modulation in this case is not periodic, but the frequency behavior in the pulses from this laser is very similar to that described above: higher frequencies in the beginning of the pulse and lower frequencies in its tail. In this embodiment, external modulation of the laser output is not required. A high degree of integration of electrical and optical functions provides significant advantages of this embodiment for commercial applications. The output of the directly modulated diode laser 81 is connected to a frequency chirp converter 83.

Figure 9:
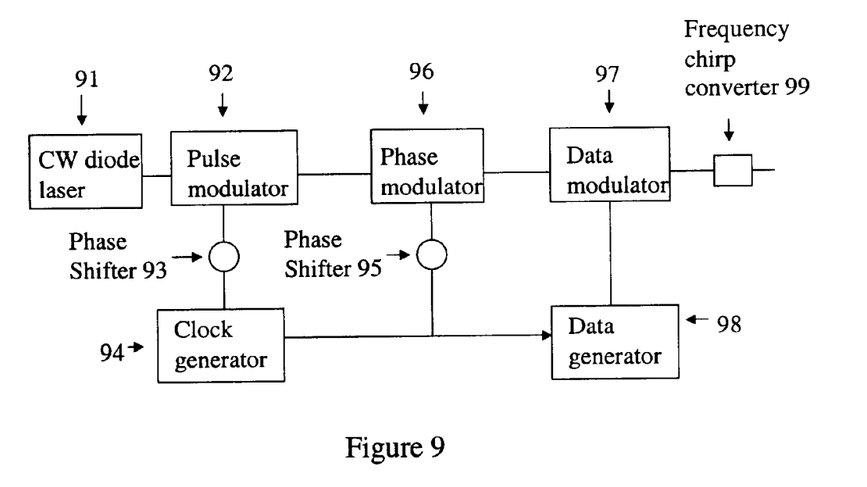
FIG. 9 shows a schematic diagram of an optical transmitter having a CW diode laser with external phase and data modulation and a frequency chirp converter.

In another embodiment, shown in FIG. 9, the optical transmitter can utilize a CW semiconductor diode laser 91 as a light source. To provide transmitter functions, this embodiment employs three modulators: pulse modulator 92, phase modulator 96 and data modulator 97 driven by clock generator 94 and data generator 98, respectively. Pulse modulator 92 is driven by clock generator 94 through phase shifter 93 and operates in a linear regime. Phase modulator 96 is driven by clock generator 94 via phase shifter 95, and data modulator 97 is driven by data generator 98. The sequence of three modulators is used to produce data modulated spectrally enriched optical pulses. Significant reduction of nonlinear distortion within the transmission line can be achieved by adjusting the voltage applied to the phase modulator 96 and obtaining the frequency chirp of the optical pulses similar to the frequency chirp induced by SPM but with the opposite sign. Data modulator 97 is connected to a frequency chirp converter 99.

Figure 10:
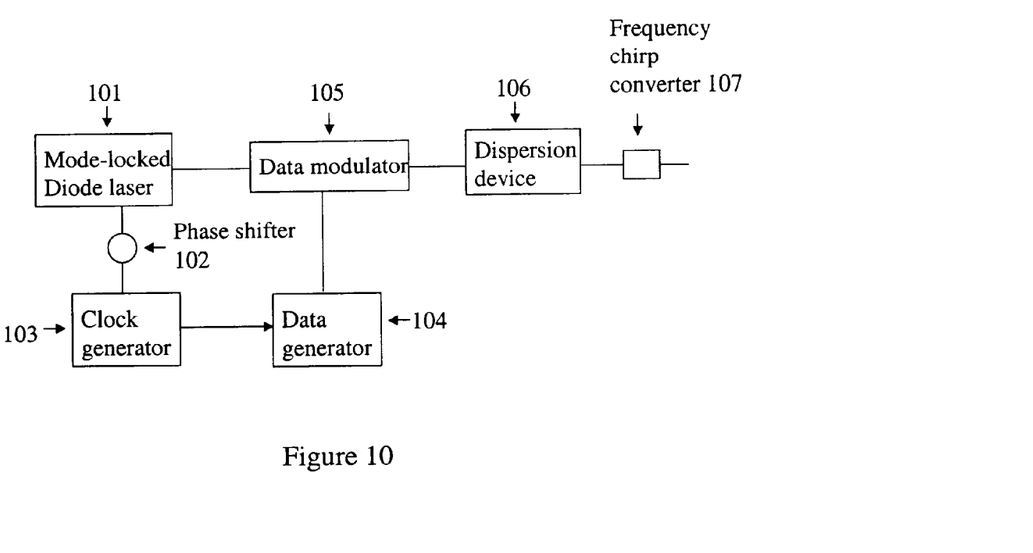
FIG. 10 shows a schematic diagram of an optical transmitter having a mode-locked laser with an external data modulator and a dispersion device that is connected to a frequency chirp converter.

In FIG. 10, yet another embodiment is presented utilizing a mode-locked diode laser 101 as a source of optical pulses. A sequence of short optical pulses emitted by the diode laser 101 is modulated by a data modulator 105, and stretched and chirped by a dispersion device 106. The mode-locked laser 101 and the data modulator 104 are driven by a clock generator 103 and a data generator 104, respectively synchronized to each other. A phase shifter 102 is used to adjust the phase delay between driving voltages for the mode-locked laser 101 and the data modulator 105. The mode-locked laser 101 provides short optical pulses of about 5% to 15% of the bit period having optical spectrum adequate for compensation of SPM-induced nonlinear spectral products. Data modulator 105 is used to load digital data into this sequence of short optical pulses. The dispersion device 106 connected to an output of data modulator 105 stretches the duration of these pulses to about 20% to 50% of the bit period, and introduces a frequency chirp working against the frequency chirp introduced by SPM. The optical pulses then passes through a frequency chirp converter 107.

Figure 11:
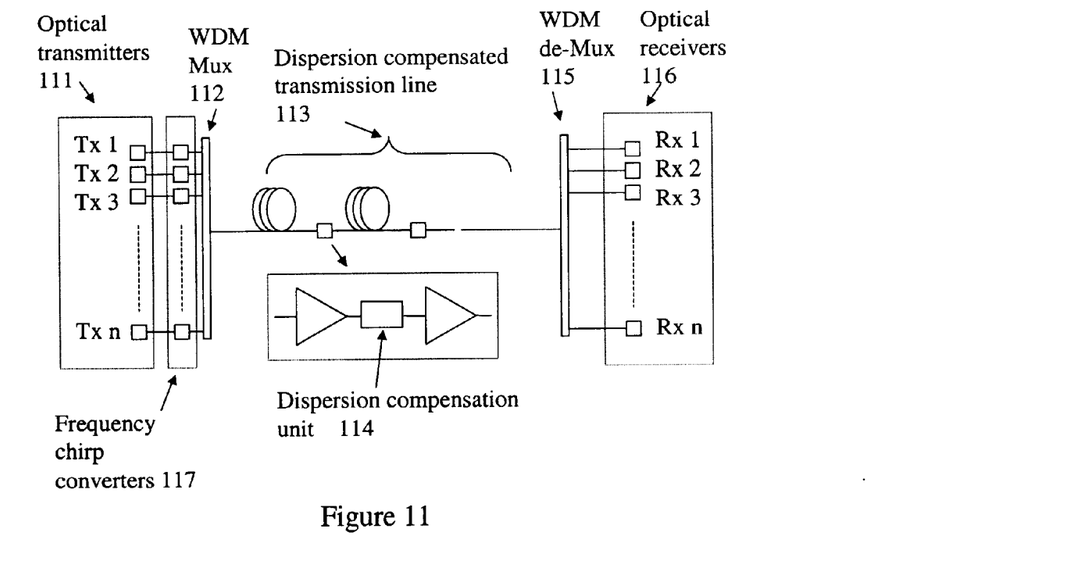
FIG. 11 shows a schematic diagram of a multichannel WDM communication system for propagating phase and data modulated spectrally enriched optical pulses via a dispersion compensated transmission line having a plurality of WDM transmitters connected to a respective plurality of frequency chirp converters.

A significant number of the fiber optic systems deployed in the field are multichannel WDM systems. FIG. 11 shows a multichannel WDM communication system for propagating spectrally enriched data modulated optical pulses with a frequency chirp via dispersion compensated transmission line. The WDM system comprises a plurality of WDM optical transmitters 111 for generating data modulated spectrally enriched optical pulses. The generated pulses in each channel have a spectrum that is substantially wider than the spectrum of Fourier-transform limited pulses of the same duration. Each of WDM optical transmitters 111 is connected to each of frequency chirp converters 117. A WDM multiplexer 112 combines pre-chirped outputs of the WDM optical transmitters 111 into a multiplexed optical signal. The multiplexed optical signal is transmitted via a dispersion compensated transmission line 113 comprising a plurality of spans and a plurality of dispersion compensation units 114. Each dispersion compensation unit is placed between each pair of adjacent spans. A WDM demultiplexer 115 demultiplexes the WDM multiplexed optical signal into a plurality of individual optical signals. A plurality of optical receivers 116 corresponding to the plurality of the WDM optical transmitters 111 receive respective pluralities of optical pulses having spectra comparable to the Fourier-transform limit. The error free propagation distance is the maximum length of dispersion compensated transmission line within which the temporal shape of each pulse is unchanged (although the pulse spectrum would have been depleted to the Fourier-transform limit).

Figure 12:
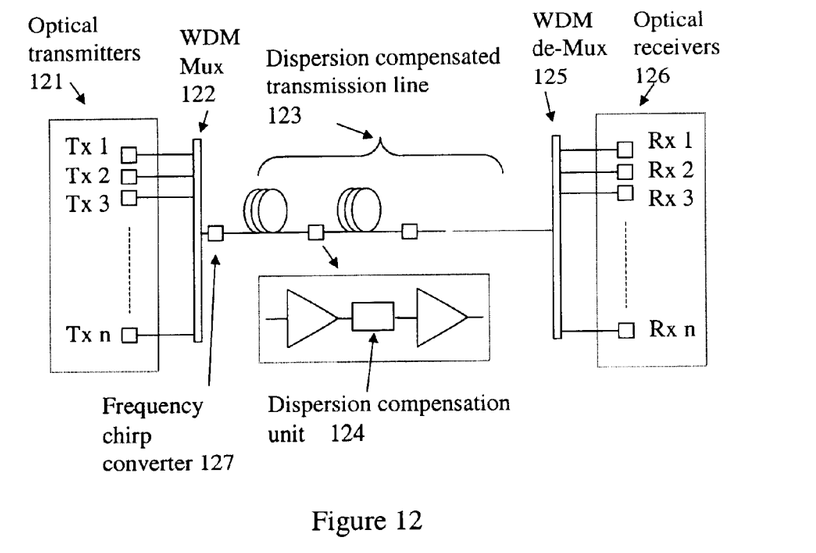
FIG. 12 shows a schematic diagram of a multichannel WDM communication system for propagating phase and data modulated spectrally enriched optical pulses via a dispersion compensated transmission line having a plurality of WDM transmitters coupled to a frequency chirp converter via WDM multiplexer.

For the WDM transmission each of the frequency chirp converters 1117 can be coupled externally with each of the transmitters 111 respectively, as shown in FIG. 11 or each frequency chirp converter can be within each transmitter as disclosed above. Alternatively, a single frequency chirp converter 127 can be coupled to the output of the WDM multiplexer 122 to pre-chirped all the wavelength channels, as shown in FIG. 12. When a single frequency chirp converter is used, its dispersion slope should match the dispersion slope of the transmission fiber.

The invention has been described above by way of examples but these examples are not intended to limit the scope of the invention. The disclosure is intended to be interpreted broadly, and not intended to represent all modifications and variations that may be apparent to a person skilled in the art without departing form the spirit and scope of the present invention as defined by the appended claims.

What is claimed is:

1. A system for transmitting signals over an optical fiber using spectrally enriched optical pulses comprising:

an optical transmitter with an optical source for generating data modulated spectrally enriched optical pulses with a frequency chirp which is similar in shape and opposite in sign to a self-phase-modulation-induced chirp and having a spectrum substantially wider than a spectrum of Fourier-transform limited pulses of the same duration;

a frequency chirp converter coupled to an input of said optical fiber for providing an externally induced frequency chirp and converting the frequency chirp of said spectrally enriched optical pulses; and an optical receiver placed within the optical fiber at or beyond an error free propagation distance from said optical transmitter for receiving said optical pulses, wherein a spectrum of said optical pulses being gradually depleted while propagating along the optical fiber; and a degree of depletion is slowing down due to a non-linear spectrum of said optical pulses caused by said externally induced frequency chirp.

2. The system for transmitting signals of claim 1, wherein the spectrum of said optical pulses depletes along said error free propagation distance from the spectrum that is substantially wider than the Fourier-transform limit to the spectrum that is comparable to the Fourier-transform limit, while a temporal shape of each of said optical pulses is substantially the same at an input and an output of said error free propagation distance.

3. The system for transmitting signals of claim 2, wherein a frequency chirp converter is a dispersion compensating means having a dispersion sign opposite to a dispersion sign of the optical fiber.

4. The system for transmitting signals of claim 3, further comprising at least one dispersion compensating unit having a dispersion compensator and at least one optical amplifier, said dispersion compensating unit is placed between said optical transmitter and optical receiver for restoration of the temporal shape of each of said optical pulses.

5. The system for transmitting signals of claim 4, wherein said optical source is a directly modulated diode laser, an output of said directly modulated diode laser is connected to said frequency converter.

6. The system for transmitting signals of claim 4, wherein said optical source is a CW diode laser.

7. A system for transmitting signals over an optical fiber using spectrally enriched optical pulses comprising:

an optical transmitter with an optical source for generating data modulated spectrally enriched optical pulses with a frequency chirp having a spectrum substantially wider than a spectrum of Fourier-transform limited pulses of the same duration;

a frequency chirp converter coupled to an input of said optical fiber for providing an externally induced frequency chirp and converting the frequency chirp of said spectrally enriched optical pulses; and an optical receiver placed within the optical fiber at or beyond an error free propagation distance from said optical transmitter for receiving said optical pulses, wherein a spectrum of said optical pulses being gradually depleted while propagating along the optical fiber; and a degree of depletion is slowing down due to a non-linear spectrum of said optical pulses caused by said externally induced frequency chirp;

wherein the spectrum of said optical pulses depletes along said error free propagation distance from the spectrum that is substantially wider than the Fourier-transform limit to the spectrum that is comparable to the Fourier-transform limit, while a temporal shape of each of said optical pulses is substantially the same at an input and an output of said error free propagation distance;

wherein a frequency chirp converter is a dispersion compensating means having a dispersion sign opposite to a dispersion sign of the optical fiber;

the system further comprising at least one dispersion compensating unit having a dispersion compensator and at least one optical amplifier, said dispersion compensating unit is placed between said optical transmitter and optical receiver for restoration of the temporal shape of each of said optical pulses;

wherein said optical source is a CW diode laser; and wherein said optical transmitter further comprises, a pulse modulator connected to said CW diode laser for modulating light generated by said CW diode laser, a clock generator connected to said pulse modulator for generating electrical pulses and applying thereof to said modulated light, a phase modulator connected to said pulse modulator for phase modulating an output of said pulse modulator and providing said optical pulses with said frequency chirp, said clock generator connected to said phase modulator for generating electrical pulses providing said frequency chirp, a data modulator connected to an output of said phase modulator for modulating said optical pulses by a data signal, an output of said data modulator is connected to said frequency converter, and a generator of a data signal connected to said data modulator for providing said data signal.

8. A system for transmitting signals over an optical fiber using spectrally enriched optical pulses comprising:

an optical transmitter with an optical source for generating data modulated spectrally enriched optical pulses with a frequency chirp having a spectrum substantially wider than a spectrum of Fourier-transform limited pulses of the same duration;

a frequency chirp converter coupled to an input of said optical fiber for providing an externally induced frequency chirp and converting the frequency chirp of said spectrally enriched optical pulses; and an optical receiver placed within the optical fiber at or beyond an error free propagation distance from said optical transmitter for receiving said optical pulses wherein a spectrum of said optical pulses being gradually depleted while propagating along the optical fiber, and a degree of depletion is slowing down due to a non-linear spectrum of said optical pulses caused by said externally induced frequency chirp;

wherein the spectrum of said optical pulses depletes along said error free propagation distance from the spectrum that is substantially wider than the Fourier-transform limit to the spectrum that is comparable to the Fourier-transform limit, while a temporal shape of each of said optical pulses is substantially the same at an input and an output of said error free propagation distance;

wherein a frequency chirp converter is a dispersion compensating means having a dispersion sign opposite to a dispersion sign of the optical fiber;

the system further comprising at least one dispersion compensating unit having a dispersion compensator and at least one optical amplifier, said dispersion compensating unit is placed between said optical transmitter and optical receiver for restoration of the temporal shape of each of said optical pulses;

wherein said optical source is a mode-locked laser connected to and driven by a clock generator.

9. The system for transmitting signals of claim 8, wherein said optical transmitter further comprises:

a data modulator connected to said mode-locked laser for modulating an output of said mode-locked laser by a data signal;

a data generator connected to said data modulator for driving said data modulator, said data generator connected to said clock generator for synchronization of a data signal with the clock; and a dispersion device connected to an output of said data modulator for expanding duration of said optical pulses, wherein an output of said dispersion device is connected to said frequency converter.

10. A system for transmitting signals over an optical fiber using spectrally enriched optical pulses comprising:

an optical transmitter for generating phase and data modulated optical pulses with a frequency chirp which is similar in shape and opposite in sign to a self-phase-modulation-induced chirp and having a spectrum substantially wider than Fourier-transform limit, and a duration comparable to the Fourier-transform limit;

a frequency converter coupled to said transmitter for providing an externally induced frequency chirp and converting the frequency chirp of said data modulated optical pulses;

a dispersion compensated transmission line coupled to an output of said frequency converter and comprising an error free propagation region having an input and an output, the spectrum of said optical pulses being substantially wider than the Fourier-transform limited spectrum at said input and comparable to the Fourier transform limited spectrum at said output, while a temporal shape of each of said optical pulses being substantially the same at said entrance and exit; and an optical receiver placed within said dispersion compensated transmission line for receiving said optical pulses exiting said error free propagation region.

11. The system for transmitting signals of claim 10, wherein said dispersion compensated transmission line is a segment of the optical fiber comprising at least one dispersion compensating unit having a dispersion compensator and at least one optical amplifier, said dispersion compensating unit being placed between said optical transmitter and optical receiver for restoration of the temporal shape of each of said optical pulses, and said frequency converter is a dispersion compensating means having a dispersion sign opposite to a dispersion sign of said dispersion compensated transmission line.

12. The system for transmitting signals of claim 10, wherein said dispersion compensated transmission line is a segment of the optical fiber comprising a plurality of spans, each said span comprising an amplifier, and at least two adjacent spans comprising a dispersion compensator.

13. The system for transmitting signals of claim 12, wherein the spectrum of said optical pulses is monotonically depleted along said error free propagation region, the monotonical depletion of said spectrum is slowing down along said error free propagation region due to a non-monotonic production of non-linear spectrum of said optical pulses.

14. The system for transmitting signals of claim 12, wherein the spectrum of said optical pulses is non-monotonically depleted along said error free propagation region, the non-monotonical depletion of said spectrum is slowing down along said error free propagation region due to a non-monotonic production of non-linear spectrum of said optical pulses.

15. A multichannel WDM communication system for propagating signals utilizing spectrally enriched optical pulses via an optical fiber comprising:

a plurality of optical transmitters for generating and transmitting data modulated spectrally enriched optical pulses with a frequency chirp which is similar in shape and opposite in sign to a self-phase-modulation-induced chirp and having a spectrum occupying a substantial part of a slot on ITU grid and being substantially wider than a spectrum of Fourier-transform limited pulses of the same duration;

at least one frequency chirp converter coupled to said plurality of optical transmitters for providing an externally induced frequency chirp and converting the frequency chirp of said data modulated spectrally enriched optical pulses;

a dispersion compensated transmission line coupled to said at least one frequency chirp converter and comprising an error free propagation distance for propagating said optical pulses throughout, the spectrum of said optical pulses being depleted while propagating along said error free propagation distance and a temporal shape of said pulses being substantially the same at an input and an output of said error free propagation distance; and a plurality of optical receivers placed within said optical fiber at or beyond said error free propagation distance from said optical transmitter for receiving propagated optical pulses.

16. The multichannel WDM communication system of claim 15, wherein said at least one frequency chirp converter is a dispersion means having a dispersion compensating sign opposite to a dispersion compensating sign of said dispersion compensating transmission line.

17. The multichannel WDM communication system of claim 16, wherein the spectrum of said optical pulses depletes gradually along said error free propagation distance from the spectrum that is substantially wider than the Fourier-transform limit to the spectrum that is comparable with the Fourier-transform limit, a non-monotonic production of non-linear spectrum of said optical pulses causes the gradual depletion of said spectrum along said error free propagation region.

18. The multichannel WDM communication system of claim 17, wherein said dispersion compensated transmission line comprises:

a first plurality of spans of the optical fiber; and a second plurality of dispersion compensating units for restoration of the temporal shape of said optical pulses transmitted along said error-free propagation distance.

19. The multichannel WDM communication system of claim 18, wherein each said unit is placed between a pair of adjacent spans of said plurality of spans and comprises a dispersion compensator and at least one optical amplifier.

20. The multichannel WDM communication system of claim 18, wherein each said unit is provided for at least two spans of said first plurality, each said at least two spans comprises an optical amplifier.

21. The multichannel WDM communication system of claim 18, wherein a plurality of said frequency chirp converters coupled to a respective plurality of optical transmitters.

22. An optical transmitter for long haul optical fiber system comprising:

a laser source for providing a sequence of spectrally enriched optical pulses with a frequency chirp, said optical pulses having a spectrum substantially wider than a spectrum of Fourier-transform limited pulses of the same duration;

a clock generator connected to said laser source for driving said laser source;

a data modulator connected to an output of said laser source for modulating externally said sequence of optical pulses;

a data generator connected to said data modulator for driving said data modulator;

a phase shifter connected to said laser source for providing time delay adjustment between said clock generator and said data generator; and a frequency chirp converter coupled to said laser source for converting the frequency chirp of said data modulated spectrally enriched optical pulses.

23. The optical transmitter of claim 22, wherein said laser source is a directly modulated diode laser, and said frequency chirp converter is connected to an output of said data modulator.

24. The optical transmitter of claim 22, wherein said laser source is a mode-locked diode laser.

25. The optical transmitter of claim 24, further comprising a dispersion device connected to an output of said data modulator for stretching said optical pulses to a duration about 20% to 50% of the bit period and introducing a frequency chirp opposite to a frequency chirp of an optical fiber, said frequency chirp converter is connected to an output of said dispersion device.

26. An optical transmitter for long haul optical fiber system comprising:
   a directly modulated diode laser for providing a sequence of spectrally enriched optical pulses with a frequency chirp, said optical pulses having a spectrum substantially wider than a spectrum of Fourier-transform limited pulses of the same duration;
   electronic unit connected to an input of said directly modulated diode laser, said electronic unit comprising a clock generator and an electrical data signal generator for driving said directly modulated diode laser, said clock generator and said electrical data signal generator providing said optical pulses with said frequency chirp and data, respectively; and
   a frequency chirp converter coupled to an output of said directly modulated laser for converting the frequency chirp of said spectrally enriched optical pulses.

27. A method of transmitting signals using spectrally enriched optical pulses via an optical fiber, comprising the steps of:
   generating phase and data modulated optical pulses with a frequency chirp which is similar in shape and opposite in sign to a self-phase-modulation-induced chirp and having an optical spectrum substantially wider than a spectrum of Fourier-transform limited pulses of the same duration;
   transmitting said optical pulses via an error free propagation region of the optical fiber so that the spectrum of said optical pulses is depleted along said error free propagation region from the spectrum substantially wider than the spectrum of Fourier-transform limited pulses to a spectrum comparable to the Fourier-transform limited pulses, and a temporal shape of each of said optical pulses being substantially the same at an input and an output of said error-free propagation region; and
   extending said error free propagation region by slowing down the depletion of the spectrum of said optical pulses by providing an externally induced frequency chirp causing a non-monotonic propagation of a non-linear spectrum of said optical pulses.

28. The method of transmitting signals of claim 27, wherein the step of extending said error free propagation region comprises the steps of:
   introducing an external dispersion by a frequency chirp converter having a dispersion sign opposite to a dispersion sign of the optical fiber for providing the non-monotonic propagation of the non-linear spectrum production of said optical pulses; and
   compensating for a non-linear effect induced by said external dispersion for providing spectral depletion of the spectrum of said optical pulses.

29. The method of transmitting signals of claim 28, wherein said error free propagation region comprises n spans of the optical fiber, where n>1.

30. The method of transmitting signals of claim 29, wherein the compensation for a non-linear effect provides at about a half of a non-linear length of each said n spans of the optical fiber.

31. A method of transmitting signals using spectrally enriched optical pulses via an optical fiber, comprising the steps of:
   generating phase and data modulated optical pulses with a frequency chirp having an optical spectrum substantially wider than a spectrum of Fourier-transform limited pulses of the same duration;
   transmitting said optical pulses via an error free propagation region of the optical fiber so that the spectrum of said optical pulses is depleted along said error free propagation region from the spectrum substantially wider than the spectrum of Fourier-transform limited pulses to a spectrum comparable to the Fourier-transform limited pulses, and a temporal shape of each of said optical pulses being substantially the same at an input and an output of said error-free propagation region; and
   extending said error free propagation region by slowing down the depletion of the spectrum of said optical pulses by providing an externally induced frequency chirp causing a non-monotonic propagation of a non-linear spectrum of said optical pulses;
   wherein the step of extending said error free propagation region comprises the steps of,
   introducing an external dispersion by a frequency chirp converter having a dispersion sign opposite to a dispersion sign of the optical fiber for providing the non-monotonic propagation of the non-linear spectrum production of said optical pulses, and
   compensating for a non-linear effect induced by said external dispersion for providing spectral depletion of the spectrum of said optical pulses;
   wherein said error free propagation region comprises n spans of the optical fiber, where n>1;
wherein the compensation for a non-linear effect provides by at least one dispersion compensator for 2n said spans by placing said dispersion compensator at about a half distance between an output of non-linear length of the n span and an input of the n+1 span.

32. A method of transmitting signals using spectrally enriched optical pulses via an optical fiber, comprising the steps of:
   generating phase and data modulated optical pulses with a frequency chirp having an optical spectrum substantially wider than a spectrum of Fourier-transform limited pulses of the same duration;
   transmitting said optical pulses via an error free propagation region of the optical fiber so that the spectrum of said optical pulses is depleted along said error free propagation region from the spectrum substantially wider than the spectrum of Fourier-transform limited pulses to a spectrum comparable to the Fourier-transform limited pulses, and a temporal shape of each of said optical pulses being substantially the same at an input and an output of said error-free propagation region; and
   extending said error free propagation region by slowing down the depletion of the spectrum of said optical pulses by providing an externally induced frequency chirp causing a non-monotonic propagation of a non-linear spectrum of said optical pulses;
   wherein the step of extending said error free propagation region comprises the steps of,
   introducing an external dispersion by a frequency chirp converter having a dispersion sign opposite to a dispersion sign of the optical fiber for providing the non-monotonic propagation of the non-linear spectrum production of said optical pulses, and compensating for a non-linear effect induced by said external dispersion for providing spectral depletion of the spectrum of said optical pulses;

wherein said error free propagation region comprises n spans of the optical fiber, where n>1, wherein the compensation for a non-linear effect provides by at least one dispersion compensator for 2n+1 said spans, by placing said dispersion compensator at about a half distance between an output of non-linear length of the n span and an input of the n+1 span.

33. A method of transmitting signals using spectrally enriched optical pulses via an optical fiber, comprising the steps of:

generating phase and data modulated optical pulses with a frequency chirp having an optical spectrum substantially wider than a spectrum of Fourier-transform limited pulses of the same duration;

transmitting said optical pulses via an error free propagation region of the optical fiber so that the spectrum of said optical pulses is depleted along said error free propagation region from the spectrum substantially wider than the spectrum of Fourier-transform limited pulses to a spectrum comparable to the Fourier-transform limited pulses, and a temporal shape of each of said optical pulses being substantially the same at an input and an output of said error-free propagation region; and extending said error free propagation region by slowing down the depletion of the spectrum of said optical pulses by providing an externally induced frequency chirp causing a non-monotonic propagation of a non-linear spectrum of said optical pulses;

wherein the step of extending said error free propagation region comprises the steps of, introducing an external dispersion by a frequency chirp converter having a dispersion sign opposite to a dispersion sign of: the optical fiber for providing the non-monotonic propagation of the non-linear spectrum production of said optical pulses, and compensating for a non-linear effect induced by said external dispersion for providing spectral depletion of the spectrum of said optical pulses;

wherein said error free propagation region comprises n spans of the optical fiber, where n>1;

wherein the compensating for a non-linear effect provides by at least one dispersion compensator for 2n+1 said spans, by placing said dispersion compensator at about a half of non-linear length of the n+1 span.

* * * * *

UNITED STATES PATENT AND TRADEMARK OFFICE
CERTIFICATE OF CORRECTION

PATENT NO. : 6,856,770 B2
DATED : February 15, 2005
INVENTOR(S) : Yu Sheng Bai

It is certified that error appears in the above-identified patent and that said Letters Patent is hereby corrected as shown below:

Column 8,
Line 54, delete the word "fat" and insert the word -- (at --

Column 10,
Line 42, delete the word "form" and insert the word -- from --

Column 12,
Line 24, after the word "pulses", insert -- , --
Line 26, after the word "fiber", insert -- ; --

Column 18,
Line 14, after the word "of", delete ":"

Signed and Sealed this

Twenty-first Day of June, 2005

JON W. DUDAS
*Director of the United States Patent and Trademark Office*